United States Patent [19]
Tagnon

[11] 3,828,842
[45] Aug. 13, 1974

[54] APPARATUS FOR FIXING MOUNTING MEANS ON SPECTACLE LENSES

[75] Inventor: Luc Andre Tagnon, Saint Mande, France

[73] Assignee: Essilor International, Paris, France

[22] Filed: Aug. 15, 1972

[21] Appl. No.: 280,800

[30] Foreign Application Priority Data
Aug. 25, 1971 France .............................. 71.30817

[52] U.S. Cl..................... 164/334, 425/808, 51/160
[51] Int. Cl............................................. B22d 19/00
[58] Field of Search ............ 164/332, 334; 425/808; 51/160, 284

[56] References Cited
UNITED STATES PATENTS

| | | | |
|---|---|---|---|
| 2,745,138 | 5/1956 | Beattie............................... | 425/808 |
| 3,187,469 | 6/1965 | Slack et al. ........................ | 51/284 X |
| 3,257,686 | 6/1966 | Merker et al. ..................... | 425/808 |
| 3,258,879 | 7/1966 | Edelstein .......................... | 425/808 |
| 3,507,076 | 4/1970 | Rudd et al. ....................... | 164/332 X |

Primary Examiner—J. Spencer Overholser
Assistant Examiner—V. K. Rising
Attorney, Agent, or Firm—Robert E. Burns; Emmanuel J. Lobato; Bruce L. Adams

[57] ABSTRACT

This apparatus is intended for fixing to the convex surface of a spectacle lens, by casting, a metal block provided with means for subsequently properly engaging same on the spindle of a trimming and/or bevelling machine, notably in the manufacture of ophthalmic lenses having complex optical characteristics, such as cylindrical, toroidal, multifoci lenses, as well as lenses having a gradually increasing optical power and, in addition, a certain general prismatic character. This apparatus comprises essentially lens holding means, sighting means, and means for casting a low-melting metal for forming said block in which reference means are adapted to be engaged in and on said spindle with the assistance of a reference cross-line and sighting axes, whereby an automatic and accurate positioning of the lens in the trimming and/or bevelling machine is obtained.

10 Claims, 11 Drawing Figures

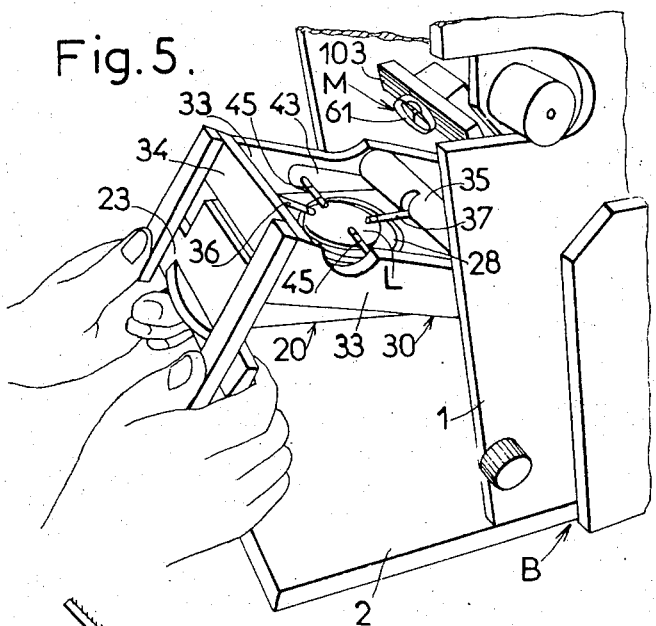
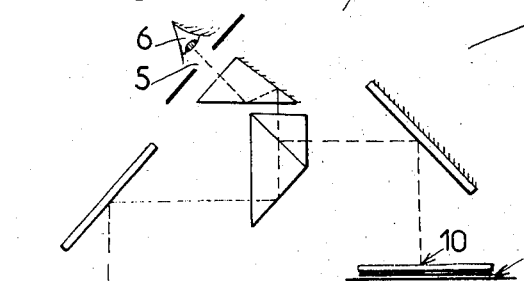
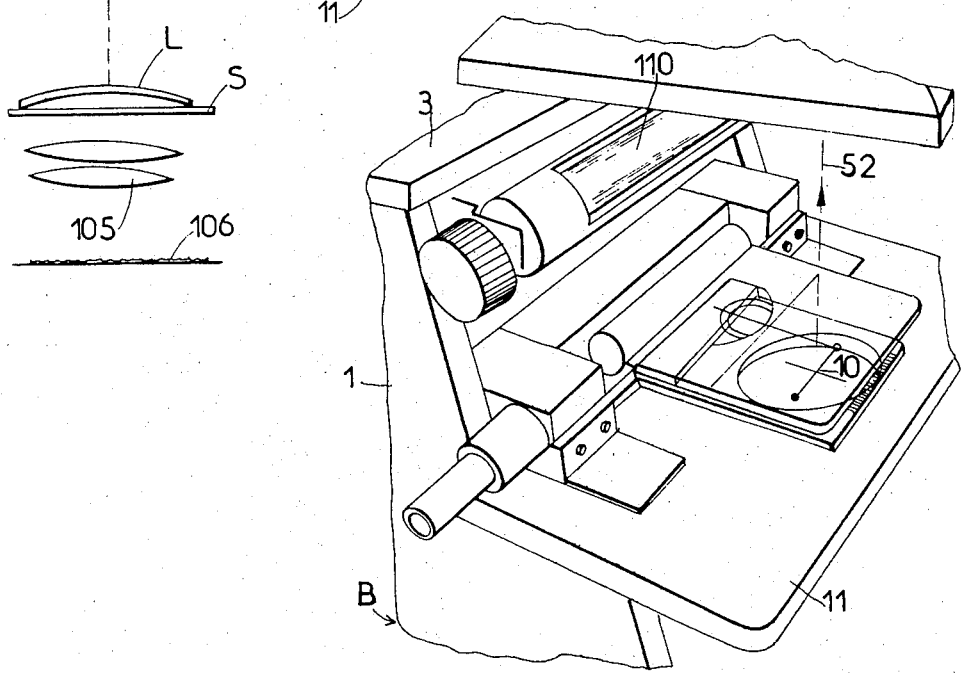

APPARATUS FOR FIXING MOUNTING MEANS ON SPECTACLE LENSES

FIELD OF THE INVENTION

This invention relates to an apparatus for fixing to a spectacle lens means for mounting the lens in a trimming or bevelling machine, said means being such that it is only necessary to engage same on the spindle of the trimming or bevelling machine for obtaining the desired positioning of the optical characteristics of the lens in the contour of the rim or bezel of the spectacle frame chosen by the future wearer of the spectacles.

BACKGROUND OF THE INVENTION

This apparatus is particularly adapted for preparing the mounting, in a spectacle frame, of lenses having complex optical characteristics, notably cylindrical toroidal, multifocal lenses, as well as lenses having a gradually increasing optical power and in addition a certain general prismatic shape.

In the present state of spectacle manufacture, the optician receives from the lens surfacer a circular glass carrying useful reference marks such as the center and possibly the directions, such as the axis of a cylindrical lens. The customer having selected his spectacle frame, the optician is confronted with the task of fitting the lenses to the frame and must to this end firstly determine the position of the spectacle wearer's pupil in relation to the rim or bezel of the spectacle frame.

To perform this first operation a simple and reliable device available commercially a few years ago and based on a photography, taken on a 1:1 scale, of the spectacle wearer wearing the frame without its lenses, may be used. As described in the French Pat. No. 1 315 937 and Certificate of Addition No. 86 977, it is only necessary, for instance, to measure the coordinates of the pupils of both eyes in relation to any suitable reference system. As a rule, this system comprises the reference axes of the trimming templet corresponding to the selected frame, said axes being marked either on the aforesaid photograph or etched in provisional lenses fitted in the spectacle frame, so that said axes appear directly on the photograph.

Then the optician must position the lenses in relation to the templet of the trimming machine, with due consideration for the requirements that the optical center of the lens must be strictly coincident with the pupil and that the cylinder axis of a toroidal lens, the meridian of the gradual progression of a progressive lens, or the edge of the addition segment of a multifoci lens, must be properly directed within the contour of the frame rim or bezel.

The surfacer delivers a marked or traced lens, i.e., a lens carrying a mark corresponding to the optical center and, in the case of a toroidal lens, the cylinder axis. Then the optician, by using an apparatus of the frontfocometer type, checks the lens characteristics and if necessary traces on the lens all the complementary elements to be properly taken into account when fitting the lens in the selected spectacle frame.

In the case notably of a multi-foci lens wherein the surfacer has endeavoured to make as invisible as possible the limit between the distant-vision and near-vision portions thereof, the optician marks this limit with a marker or grease pencil. This is a tedious and inaccurate operation. Alternatively, he uses a shadow method for determining the position of this limit in relation to the optical center and marks the axis of symmetry thereof as well as the tangent to the apex. As a rule, this operation is accomplished by using a system involving optical compensations of the power of certain lenses. For subsequently positioning the lens, the optician may use another apparatus available commercially for on the one hand optically superposing an image of the photograph of the spectacle wearer wearing the selected spectacle frame (this photography being positioned in the apparatus by superposing the axes of the spectacle frame contour, marked on the photograph, and a reference cross-line marked on the apparatus) and an image of the lens reproducing the marks of the characteristic elements of this lens (notably its optical center), and on the other hand, after having properly positioned the lens in relation to the photographic image, eventually causing a flexible suction-cup or disk to be pressed against the thus positioned lens, said suction cup being provided with means such as a shank or stem for mounting the lens on the spindle of the trimming machine. This apparatus is described in the U.S. Pat. No. 3586448 filed by the same Applicant.

Finally, the optician must trim and bevel the edge of the ophthalmic lens. To this end, the shank of the lens-supporting suction cup is inserted into the corresponding end of the spindle of the trimming machine. When the spindle jaws are tightened the lens is pressed against a rubber pad by a generally toothed ring adapted to compress the marginal portion of the flexible suction cup against the glass, thus causing the cup-supporting convex surface to be so directed that its plane tangent at its point of intersection with the spindle axis extends substantially at right angles to said axis, thus permitting an aesthetic mounting in the spectacle frame.

After the bevelling operation, the optician removes the lens, still supported by its suction cup, from the machine, and tests the lens in the frame rim or bezel. If the lens is too large, as in most instances, it must be fitted again on the spindle for performing the necessary retouching or finishing operation. Experience teaches that with this resilient mounting the lens seldom resumes the same position, and this obviously interferes with the final bevelling operation.

To avoid this inconvenience, a so-called blocking operation is resorted to, which consists essentially in fixing to the lens, by casting a metal having a low melting point into a mold pressed on said lens, a block formed with positioning notches and/or projections adapted to receive complementary projections and/or engage complementary notches, respectively, formed at the end of one of the clamping jaws of the spindle of said trimming machine. This metal block, when positioned with the lens on the spindle of the trimming machine, is used notably for so disposing the convex surface of the lens that its plane tangent to the points coincident with the spindle axis be perpendicular to this axis. It is current practice to use to this end a mold-supporting clamp. The convex surface of the lens fits into a hard-rubber seat constituting the mold base. When the lens is clamped, this convex surface assumes a position substantially normal to the reference axis of the mold which corresponds to the axis of the spindle of the trimming machine.

A simple transposition of this procedure to the optical superposition apparatus described hereinabove, i.e., replacing the suction cup by the mold, is not possible. In fact, the lens, marked as conventional on its convex surface, engages a support with its concave surface. As a consequence, the orientation of its convex surface with respect to the direction of application of said suction cup, and therefore to the axis of the direction of application of the mold clamping force, varies on the one hand as a function of the distance from this axis to the optical center, and on the other hand as a function of the general lens configuration, which may be strongly prismatic. To avoid this it would be necessary to mark the lens proper, instead of using a suction cup, and to use the reference marks thus traced for molding the block in a mold-supporting clamp, outside the apparatus. This procedure would obviously lead to an accumulation of errors such that the use of a suction cup is highly preferable in most cases.

From the foregoing it is clear that an optician receiving an ophthalmic lens from a surfacer and desirous to properly position this lens in the spectacle frame chosen by the wearer is confronted with a number of delicate operations to be performed very carefully, in order to minimize the number of errors which, if accrued, would yield extremely problematical results. Moreover, with a metal block, the orientation of the convex surface of the lens, which is obtained when the lens associated with the metal block is fitted to the spindle of the trimming machine, is dependent on the shape of the small central area of the convex glass surface where the glass contacts the metal block. Similarly, if a suction cup is used, the orientation of the convex lens surface obtained when tightening the elastic clamping jaws carried by the registering ends of the spindle of the trimming machine may be regarded as a means orientation subordinate to the shape of the volume of the lens portion actually clamped by the elastic jaws, and it is well known in the art that great difficulties are experienced if this volume is of prismatic character. In fact, considering a bezel rim adapted to receive the bevelled edge of a finished lens, it will be seen that it consists essentially of two surface portions of generally tapered configuration which intersect each other along a vertex or edge. The shaping of the spectacle frame, consists in fact in causing a deformation of this edge in such a manner that the curve constituted by said edge can merge into the contour of a sphere, called meniscus sphere (this sphere having the radius RM in FIG. 10 of the attached drawings), and the two surface portions of generally tapered configuration constituting the bezel must expand or spread at best on either side of the surface of said sphere. Since the bezel has a constant thickness, an aesthetic mounting will be obtained if the convex lens surface is so directed in relation to the spindle of the trimming machine that the bevel edge formed by the machine on the lens periphery is equally spaced from the edge of the convex lens surface along the entire lens contour, in order to give a homogeneous or uniform appearance to the periphery of the lens fitted in the mounting or frame. In the case of a lens having an irregular or distorted surface, such as a progressive lens, this requirement must be met as closely and adequately as possible. Under these conditions, the difficulties experienced by the optician when the only means available for properly orienting the convex surface consists in the average positioning of a small central area of said convex surface, where the glass engages the metal block or the suction cup, will be clearly apparent, whereas the deformation of a progressive lens, for instance, is aggravated towards the edges, on the one hand, and, on the other hand, the length of the peripheral contours of modern spectacle frames, according to the present fashion, increases more and more nowadays.

Up to now, the method proposed for solving this difficult problem consisted in bevelling the lens edge according to each specific case, by firstly rotating the lens slowly past the stationary grinding wheel of the bevelling machine, the lens being carried to this end by the spindle of this machine, in order to observe the future position of the bevel when the machine is actually operated, and then selecting, from a group of control cams designed for grinding the bevel and equipping the machine, with due consideration for the preceding remarks and requirements, a cam capable of forming the best bevel profile, i.e., such that the ground bevel remains substantially at the same distance from the edge of the convex surface of the lens, along the entire periphery thereof.

SUMMARY OF THE INVENTION.

The present invention is directed to provide an apparatus capable of avoiding the above-discussed inconveniences characterizing conventional practice, this apparatus being particularly simple to operate and leading not only to an appreciable reduction in the time required for fitting the lenses in a spectacle frame, but also to an improved quality of this mounting, notably by facilitating the fitting of lenses having a compound or complex shape.

To this end, the apparatus according to the present invention for fixing a metal block to the convex surface of a concavo-convex ophthalmic spectacle lens by casting a low-melting metal into a mold contacting said convex surface to permit the subsequent mounting of the lens in a predetermined position on the spindle of a trimming and/or bevelling machine, which comprises in a common frame structure a reference cross-line, means for supporting said lens, means for optically superposing two sighting axes, namely a first axis perpendicular to the center of said reference cross-line, and a second axis substantially perpendicular to the lens when said lens is supported by said support means, so as to observe the images, superposed in a same plane, of said lens and said reference cross-line, said apparatus being characterized in that said support means comprise a plate substantially horizontal in an inoperative position and adapted to support the lens, with the convex surface up, said plate being disposed in the path of the second sighting axis and suspended from gimbals or universal joints so as to be capable of tipping freely in all directions in relation to said second sighting axis, said apparatus further comprising lens holding means comprising a first pair of fixed studs each provided towards said plate with a substantially pin-point bearing portion or bearing point, said first bearing points being referred to hereinafter as the fixed bearing points, being disposed along a first secant straight line perpendicular to said second sighting axis and symmetric thereto, first return means for urging said plate towards said fixed bearing points, a second pair of movable studs comprising each formed towards said plate with a substantially pin-point bearing portion or bearing point, said second bearing points being referred to hereinafter as the movable bearing points, being disposed on a second straight line perpendicular to the plane containing said second sighting axis and said first straight line and being symmetric in relation to said plane, the studs of the second pair being movable in a direction substantially parallel to said second sighting axis on either side of a mean position in which said second straight line intersects both said second sighting axis and said first straight line, and second return means for urging said movable studs towards said plate; said apparatus further comprising casting means comprising a mold having two reference axes homologous of said cross-line, and a third reference axis homologous of said first sighting axis; and of means adapted to produce a relative movement of said support means and said mold with respect to each other from a release position, in which said support means and said mold are spaced from each other to permit the observation of the lens along said second sighting axis and to permit the positioning of said lens in relation to the image of said reference cross-line provided by the optical superposition means, to a casting position in which said mold engages the convex surface of the lens carried by said plate and in which the two reference axes of said mold which are homologous of said reference cross-line have with respect to the lens the position previously occupied in said release position by the image of said reference cross-line as given by said optical superposition means.

BRIEF DESCRIPTION OF THE DRAWINGS.

The features and advantages characterizing this invention will appear more completely from the following description given by way of illustration with reference to the accompanying drawings, in which:

FIG. 5 is a view similar to FIG. 4 showing the folding of the lens support towards a mold adapted to form a metal block on the convex lens surface;

FIG. 6 is a diagrammatic view showing the optical superposition means;

FIG. 7 is a view taken from the rear of the apparatus showing the means for supporting the photograph of the spectacle wearer;

Figure 1:
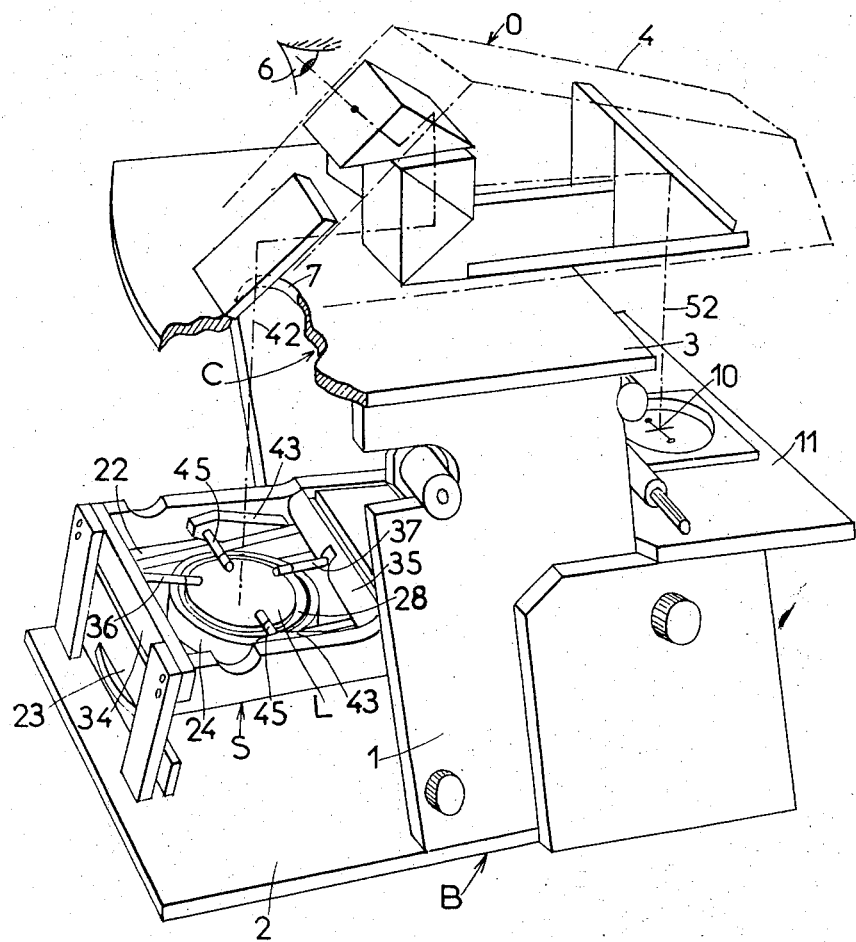
FIG. 1 is a general perspective view showing a first embodiment of the apparatus according to the present invention.

DESCRIPTION OF THE PREFERRED EMBODIMENT.

This apparatus comprises a frame structure B having two vertical side walls 1 interconnecting a base plate 2 to a top plate 3 supporting the optical device O for superposing the images, this device being protected by a hood or housing 4.

The optical image superposing device as shown diagrammatically in FIG. 6 comprises essentially a camera lucida having a sighting eyepiece 5 inclined to facilitate its use and forming on the retina of the observer 6, through a pair of orifices 7, 8 formed in said top plate 3, the images of the photograph P (or of a traced document or a templet) and of the spectacle lens L to be positioned.

A reference cross-line 10 or similar reference mark, etched on a transparent plate under which the photograph P is inserted and supported by a plane 11, permits the proper positioning of said photograph by superposing said reference cross-line and a pair of reference axes traced on the photograph P or appearing on the latter and corresponding to the reference axes of the trimming templet of the spectacle frame chosen by the future wearer.

Figure 3:
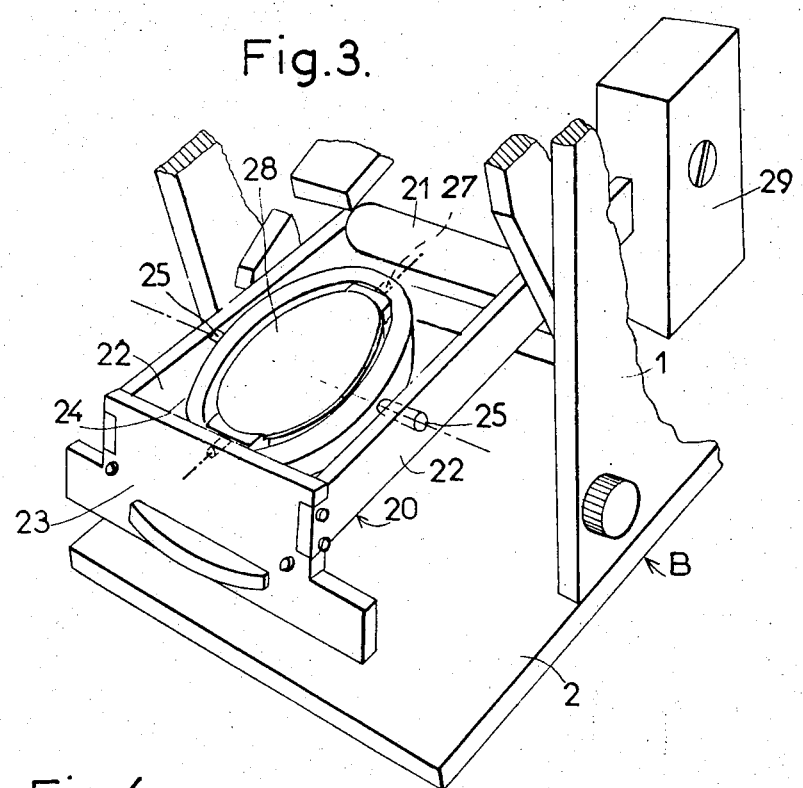
FIG. 3 is a fragmentary isometric view showing the lens support from which the means for holding the lens on said support have been removed.
Figure 4:
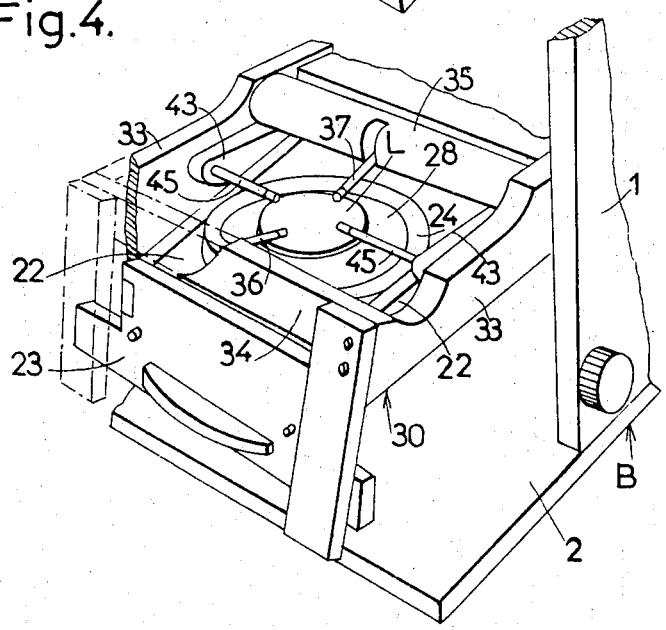
FIG. 4 is a similar view showing the lens held on said support.
Figure 10:
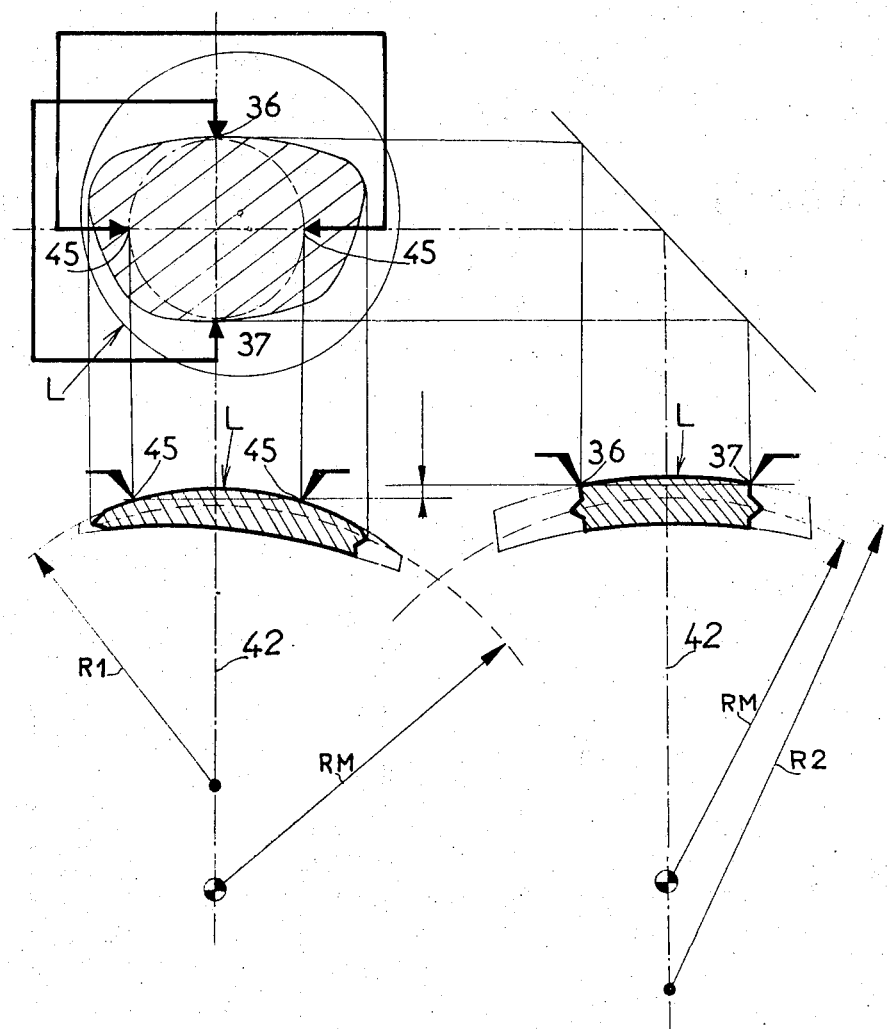
FIG. 10 is a diagram showing the positions to be imparted to the means for holding the lens on its support before casting the metal block on the convex surface of said lens.

A device S for supporting the lens L is carried by a frame 20 pivotally mounted about a fixed horizontal pin 21 disposed between the side walls 1, said frame comprising a pair of parallel arms 22 extending at right angles to said pivot pin 21 and a front cross member 23. A cylindrical casing 24 is adapted to swivel between said arms 22 about a diametral axis of said casing which is parallel to the axis of pin 21, and corresponding to a pair of pivot pins 25 each secured to one of said arms 22. The casing 24 carries in turn a plate consisting essentially of a transparent element 28 pivotally mounted by means of another pair of pivot pins 27 disposed along a casing diameter perpendicular to the axis of said pivot pins 25. The plate 28 adapted to support the lens L to be positioned with the convex surface up is thus mounted on gimbals and adapted to assume any position in relation to the frame 20 (FIG. 3). Return means illustrated in the form of a counterweight 29 (FIG. 3) constantly urges the frame 20 upwards. Means for clamping and holding the lens L on the plate 28 are carried by a pair of frames 30 and 31 pivotally mounted about the same axis as said pivot pins 21 mounting the frame 20, said pair of frames 30 and 31 surrounding the frame 20, as shown. The outer frame 30 comprises a pair of parallel side arms 33 and a pair of front and rear cross members 34 and 35, respectively, surrounding the plate 28. These cross-members 34, 35 carry each a longitudinal stud 36, 37 respectively, lying in the vertical plane perpendicular to the axis 21 and intersecting the axis of casing 24; these studs are slightly inclined downwards, and towards the plate 28. Associated with the frame 30 is an adjustable eccentric abutment member 40 carried by the side wall 1 and engaged from underneath by the rear portion of an arm 33, behind the pivot pin 21, due to the weight of said frame 30. By construction, the studs 36 and 37 are such that their free ends, in the portion adjacent the plate 28, and in a certain substantially horizontal angular position of said frame 30 about the axis 21, lie in the horizontal plane containing said axis 21 and are symmetric in relation to the sighting axis 42. The above-defined angular position of said frame 30 may be determined with precision by rotating the adjustable abutment member 40. The frame 31 extending between said frame 30 and the other frame 20, is also adapted to pivot about the axis 21. It comprises a pair of parallel arms 43 interconnected by a rear cross member, and carrying each a transverse stud 45. The two studs 45 are aligned on a common axis parallel to the axis of pivot pin 21 an intersecting the sighting axis 42 when the lower generatrices of said studs 45 lie substantially in the horizontal plane containing the axis 21. In this last-mentioned position the ends of the longitudinal and transverse studs 36, 37 and 45, respectively, are symmetric by pairs in relation to the sighting axis 42 (FIG. 10). A return spring 50 interconnecting the rear ends of frames 30 and 31 constantly urge the studs 36, 37 away from the studs 45, thus tending to press these studs 45 against the plate 28, which in turn is constantly urged upwards by the aforesaid counterweight 29. The complete assembly is so designed and constructed that the axis of casing 24, at the point of intersections of the axes of pivot pins 27 and 25, merges substantially into the sighting axis 42 when the plate 28 is spaced from studs 36, 37 by a distance corresponding substantially to the normal thickness of the spectacle lenses to be centered. With this specific arrangement, a lens L laid on the transparent plate 28 will engage with its upper convex surface the longitudinal studs 36, 37 the position of which is strictly determined for the sighting position or horizontal position of frame 30 determined in turn by the adjustment position of abutment member 40, and also by the engagement with the other pair of studs 45 remaining in a horizontal position. Under these conditions, as will be seen in the diagrammatic illustration of FIG. 10, in the case of a toroidal lens ($R_1$ different $\neq R_2$), two pairs of points of the convex lens surface, which are equally spaced from the sighting axis 42 corresponding, as will be explained presently, to the axis of the trimming machine spindle, will also be equally spaced by pairs from a sphere of any radii centered to the axis 42. Since these points are as remote as possible — by construction of the apparatus of this invention — from the axis 42, the surface equilibrium is obtained in the proximity of its contour when the lens is trimmed. Therefore, on the trimming machine, it will only be necessary to select the position of the center of the meniscus-shaping sphere (a sphere having the radius RM in FIG. 10) on the axis of the spindle of the trimming machine or, more simply, to position at a single point along the lens contour the bevel to be obtained, for grinding a bevel of adequate characteristics along the entire lens contour and corresponding to the meniscus-shaping of the spectacle frame. Thus, a greater simplicity, reliability and precision are brought to an operation hitherto performed by using successive approximations.

On the other hand, by construction, the optical image superposition device O with the reference cross-line 10 is so arranged that in the case of an observer looking through the eyepiece 5, the sighting axis 52 perpendicular to the center of said cross-line 10 is coincident with the sighting axis 42.

Means C for casting a metal block on the convex lens surface comprise under the plate 3 a tank R filled with low-melting metal, this tank R being provided with suitable heating means such as electric resistances, for melting the metal and keeping it in its molten state, and a mold M. This mold M comprises a metal body 60 surrounded by a flexible skirt 61, for example of synthetic rubber, the molding cavity being formed by the wall 63 of said body, in which impressions 64 and a central tapered centering pin 65 are formed; the mold M further comprises said skirt 61 and the convex lens surface when the lens L is caused to engage this skirt by tipping the support S about the axis 21. The impressions 64 and stud 65 are adapted, when the metal poured into the mold has set, to form complementary shaped projections and a hole on and in the metal block obtained, for the dual purpose of centering the lens on the spindle of the trimming machine while holding same in the predetermined position imparted thereto by means of the apparatus of the present invention, and permitting of rotatably driving said metal block and therefore the lens associated therewith by means of said spindle. Moreover, the impressions 64 provide two reference axes corresponding to the reference axes of the spectacle frame trimming templet. The mold M is disposed under the tank R and carried by a cross-member 70 interconnecting the two side walls 1. In the specific embodiment illustrated in FIGS. 1 to 9, the mold M is movable in relation to said cross member 70. To this end, the body 60 is mounted to one end of a rod 71 adapted to slide in a bore 72 formed in said cross member 70. A spring 73 surrounding said rod 71 constantly urges the mould M forwards. The lens support S with the clamping means consisting of said studs 36, 37 and 45, is movable about the pivot pin 21 from a release position (FIG. 2) in which the frame 30 is kept in a substantially horizontal position by means of the eccentric abutment member 40 to a casting position in which the three frames 20, 30 and 31 are tipped together upwards, towards the mold M. This last-mentioned position is determined by the engagement of an arm 33 of frame 30 with an adjustable abutment member or stop 75 carried by the cross member 70 (FIG. 9).

By construction, the mold M is so disposed that the axis of rod 71 lies in the vertical plane containing the sighting axis 42 and perpendicularly to the pivot pin 21, and in this plane it is tangent to the circular arc 80 (FIG. 2) described by the point of intersection of the straight line interconnecting the substantially pin-point fixed bearings or studs 36, 37 with the straight line interconnecting the substantially pin-point movable bearings or studs 45 when the three frames 20, 30 and 31 are tipped together from the release position to the casting position. Furthermore, still by construction, the mold M is also so disposed that in its casting position the impressions 64 thereof have the same position, with respect to the mold contacting the lens, as that occupied by the image of the reference cross-line with respect to said lens in the release position. In other words, the rod 71 and the mold impressions 64 provide for the mold three reference axes homologous of the sighting axis 52 and the reference cross-line 10, respectively.

Thus, when the support S with the frame assembly is tipped to its casting position the convex lens surface L engages the mold M or, more accurately stated, the skirt 61 thereof, which is pressed against the glass surface. The mold position must be so selected that this contact takes place even if the lens has a very shallow convexity. If, on the other hand, lenses having a pronounced convexity are to be prepared, which involves a substantial distorsion of the mold skirt 61, the mold may be caused to recede while compressing the spring 73 surrounding the rod 71, in order to provide the necessary contact pressure.

Secured to the underface of tank R overlying the skirt 61 is a molten metal distributor comprising essentially a horizontal metal tube 83 having one end 84 closed and the other end connected via a flexible hose 85, for example of silicone rubber, to the tank R containing the molten metal. In this tube 83 a radial casting orifice 85 registering with a notch 87 of skirt 61 is formed.

Figure 8:
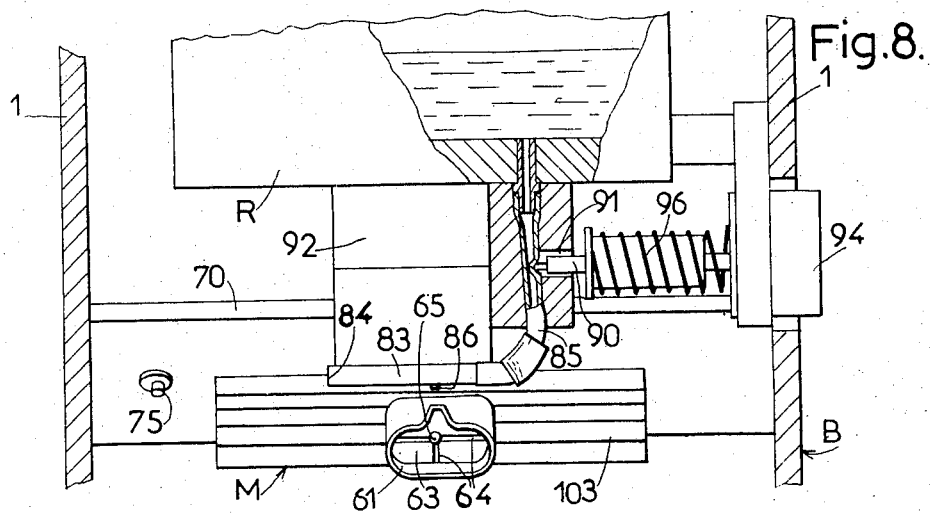
FIG. 8 is a fragmentary front view showing the casting means and the mold proper before tipping the lens support against said mold.
Figure 9:
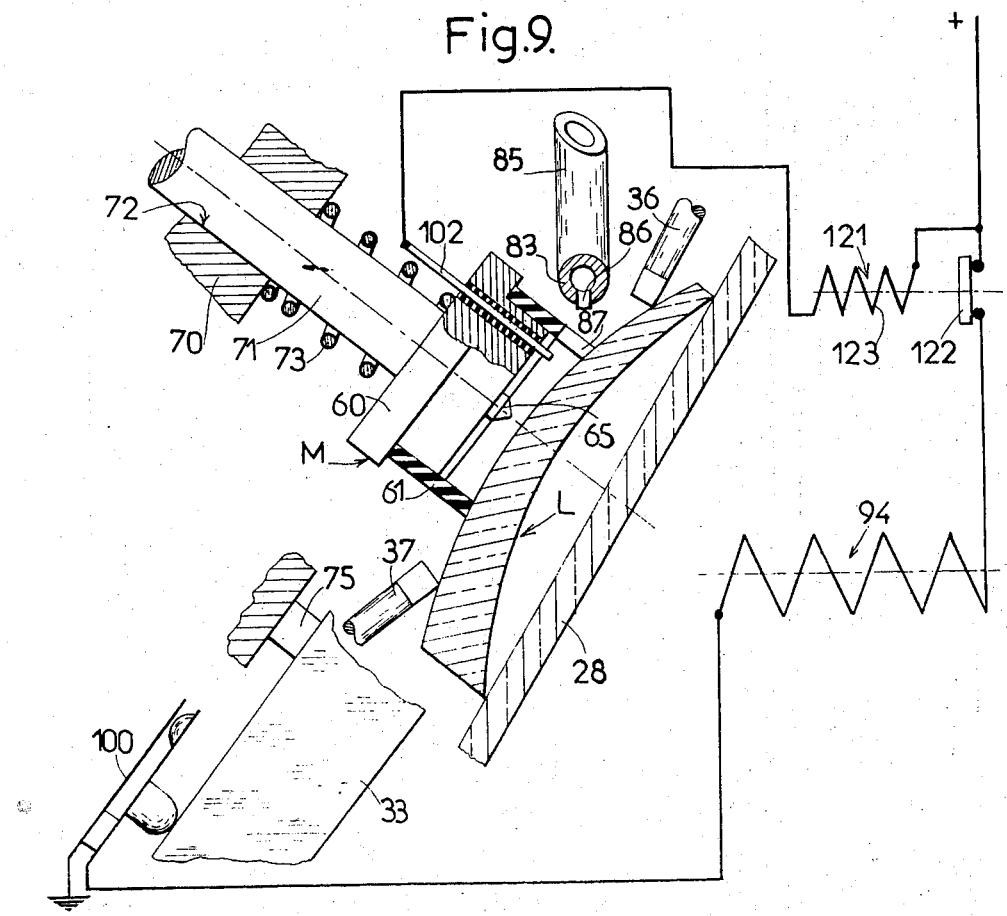
FIG. 9 shows on a larger scale, in section taken along the vertical medial plane of the mold, the lens tipped against the mold, the mold filling control means and the means for stopping the filling operation being shown in diagrammatic form.

In the embodiment illustrated in FIGS. 8 and 9, the casting means C further comprise a rod 90 slidably movable in a bore 91 of a block 92 connecting the tube 83 both mechanically and thermally to the tank R. This rod 90 engages with one end an intermediate portion of hose 85 and constitutes the extension of the plunger core of an electromagnet 94 secured to the frame structure B. In the de-energized condition of electromagnet 94 a return spring 96 constantly urges the rod 90 against the hose 85, thus throttling its inner cross-sectional passage and preventing the flow of metal from the tank R to the dispensing tube 83. The energizing circuit of electromagnet 94 is adapted to be closed by a switch 100 secured to the frame structure B and lying in the path of an arm 33 of frame 30 (see FIGS. 2 and 9). This switch 100 is adapted to be actuated by said arm 33 when the frame 30 is in its casting position, i.e., engages the adjustable stop 75, so that the electromagnet 94 is energized to withdraw the rod 90 against the force of return spring 96 and cause molten metal to flow through the casting orifice 86 into the molding cavity. When the molding cavity is filled completely, the metal contained therein contacts a normally insulated probe 102 projecting from the upper portion of the wall 63 of body 60; this probe 102 is inserted in an electric circuit adapted to cut out the energizing current of electromagnet 94. This circuit comprises another electromagnet 121 having its winding 123 adapted, when energized at the end of the mold filling operation, to actuate a switch 122 connected in series in the energizing circuit of electromagnet 94. Thus, the rod 90 is released and its tip compresses the flexible hose to cut off the supply of molten metal.

From the drawings it will be seen that the thermal link provided by the path followed by the molten metal from the heating tank R to the mold is designed with particular care to avoid any premature cooling and setting of this molten metal. Moreover, a direct passage through the block 82, just plumb to the skirt notch 87, may be contemplated. It is also advantageous to provide means, such as a finned radiator 103, for cooling the mold M. A liquid-cooling circuit may also be contemplated.

The apparatus may advantageously comprise means for facilitating the observation and centering of multifoci lenses. To this end, the casing 24 has mounted therein a lens system 105 of which the focus, when the support S is in the observation position (FIG. 2) lies substantially on the upper surface of base plate 2. Under these conditions, it is only necessary to lay on this base plate 2 a raster consisting for example of a striated reflecting surface 106 forming for an observer looking along the axis 42 an image to infinity of said raster.

When the lenses are laid on the transparent plate 28, the image of this raster is observed and appears as being somewhat distorted by the optical characteristics of the glass, so as to set in sharp contrast not only the lens contour but also its specific features such as the contour of the addition element in the case of a multifoci lens or the distant-sight, intermediate-sight and near-sight areas, in the case of a progressive lens.

It is not absolutely necessary that the optical or lens system 106 be mounted within the casing 24, in a mounting secured to the frame structure B. In fact, the primary object is to form an image to infinity of the raster 106, which, when observed along the axis 42 through the lens L, is distorted by the optical characteristics of this lens, this, as explained in the foregoing, emphasizing the lens contour as well as its specific properties.

Also in order to facilitate the observation, the apparatus according to the present invention may be provided with means 110 for illuminating the photograph P of the future wearer of the spectacles and of the reference cross-line 10, together with means 111 for illuminating the raster 106.

The above-described apparatus is operated as follows

The photograph P is positioned and adjusted by bringing into coincidence the reference axes of the mounting templet, which are traced or appear on the photograph P, together with the reference cross-line 10.

The lens L is placed in the support S and positioned by the operator utilizing to this end the camera lucida until the optical center of the lens, as traced on the glass surface, is exactly coincident with the center of the pupil of the patient's eyes appearing on the photograph P, or more exactly with the image of this center given by the image superposition means O, and in order properly to position the lens and therefore its optical characteristics (for example the edge of the addition segment in the case of a multifoci lens, the cylinder axis in the case of a toroidal lens, or the meridian of the optical progression in the case of a progressive lens) in relation to the reference cross-line and therefore to the reference axes of the spectacle mouting templet.

Then the lens L is clamped in the position thus given thereto by the operator who holds the three frames 20, 30 and 31 together.

This three-frame assembly is subsequently tipped upwards to the casting position and the casting takes place automatically.

When the cast metal block has cooled sufficiently it is only necessary to lower the frame assembly for releasing the lens adhering to the metal block from the mold.

By construction of the apparatus, the projections formed on this metal block, which are complementary to the impressions 64, are coincident with the reference axes of the mounting templet.

In the above-described embodiment of the mold M is movable by causing the mold body 60 and skirt 61 to move all together. It may be advantageous to hold this mold body 60 against movement and to provide a skirt 61 adapted to slide in fluidtight relation to said mold body. Thus, the distance from the free face of said cast block to be secured to the trimming machine to the reference plane provided by the contact tips of studs 36, 37 and 45 remains constant from one lens to another.

On the other hand, it may be noted that in the manufacture of a series of lenses having all the same convex surface, it may be advantageous, after the first casting operation, to lock the mold M in the position obtained during this first casting operation, by providing suitable means for locking the rod 71.

Figure 2:
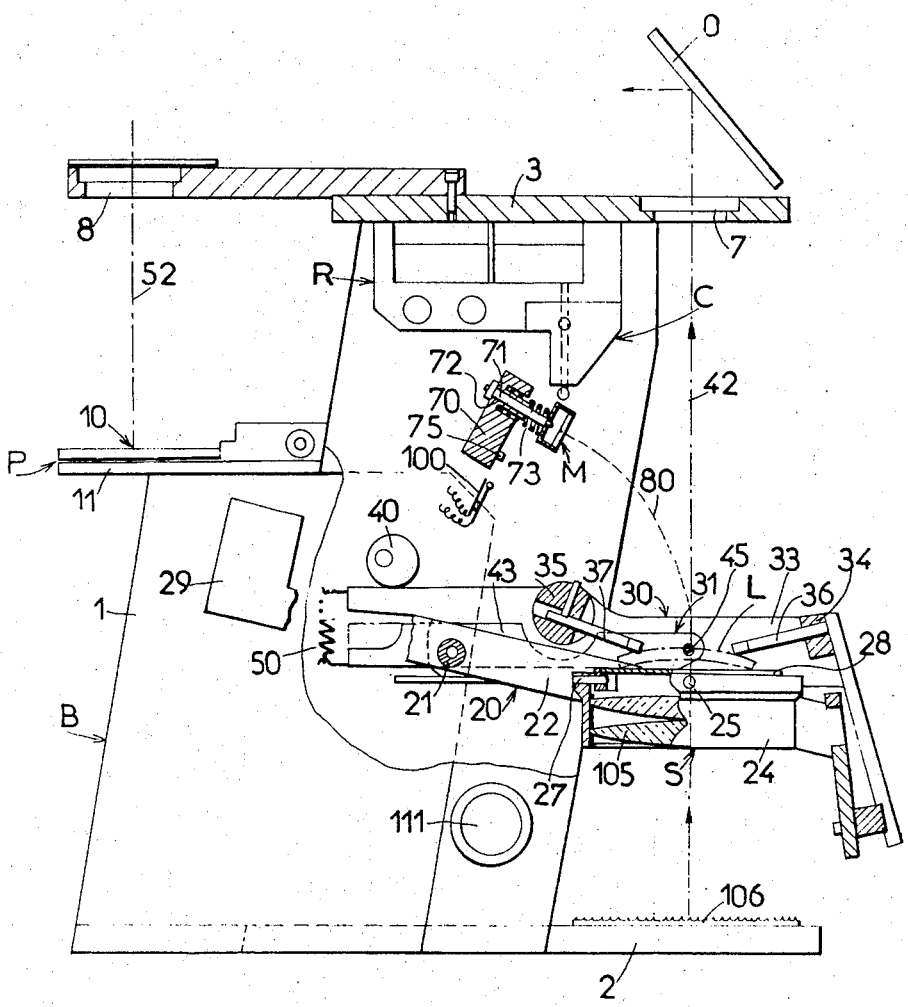
FIG. 2 is a lateral view, with portions broken away or in section, showing the various members of the apparatus of FIG. 1 in the position of the lens support means release
Figure 11:
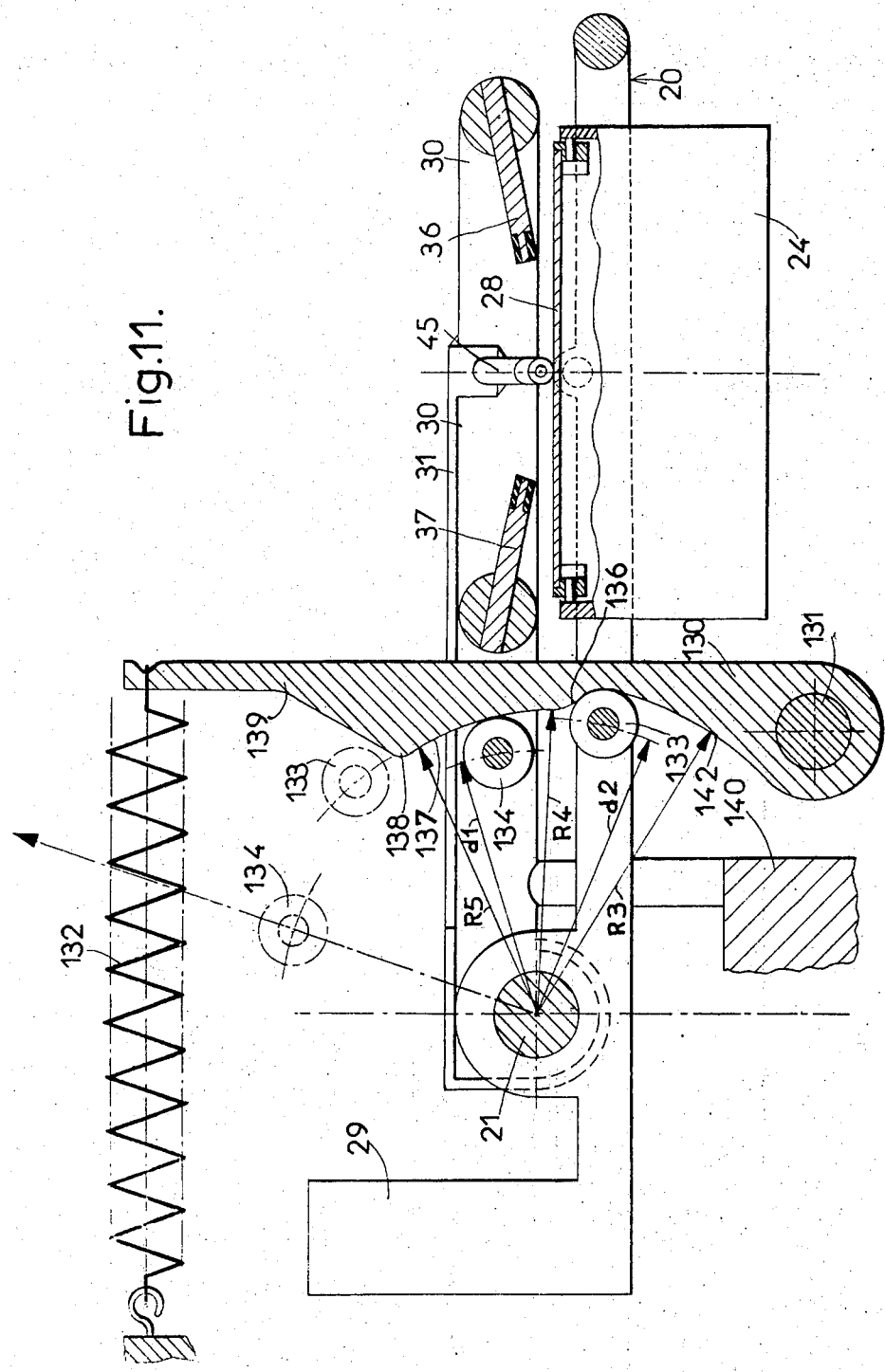
FIG. 11 is a diagrammatic section taken on a larger scale along the vertical medial plane of the apparatus, showing a modified form of embodiment of the means for guiding the folding movement of the lens support towards the means for casting the metal block.

A modified embodiment of the apparatus of this invention is illustrated in FIG. 11, wherein the reference numerals 20, 21, 24, 29, 30, 31, 36, 37 and 45 designate component elements corresponding or similar to those of the preceding embodiment, notably as shown in FIG. 2. This modified construction comprises an additional member in the form of a cam 130 pivotally mounted about a pivot pin 131 parallel to the axis of pivot pin 21 and rigid with the frame structure of the apparatus. This cam 130 is constantly urged in a counter-clockwise direction by a traction spring 132, as shown in FIG. 11, and co-acts with a pair of roller followers 133, 134 carried by the frames 20 and 30, respectively. The roller 134 is at a relatively short distance $d_1$ from the axis of pivot pin 21 (assimilated to a straight line), and the distance $d_2$ from the other roller 133 to said axis 21 is somewhat greater. The contour of cam 130 comprises from the vicinity of pivot pin 131 a section 142 of circular shape having a radius $R_3$ centered to the axis 21, a shoulder section 136 tending to produce a sudden movement of the cam contour towards the pivot pin 21 ($R_4 < R_3$), an arcuate section having a radius of curvature decreasing gradually in the direction away from the axis 131 ($R_5 < R_4$), and finally a section 139 of which the distance to the axis of pivot pin 21 increases in the direction away from the apex 138 between this section 139 and the arcuate section 137.

In the observation position of FIG. 11 the frame 20, 30 and 31 are positioned as illustrated. The reference frame 30 is set in a substantially horizontal position by bearing against an abutment member 140 similar to abutment member 40 of FIG. 2. The roller 133 is stopped during its upward travel by the shoulder 136 of cam 130. The frame 30 can be lifted so that it will carry along the other frame 31, the roller 134 rolling along the ramp 137 thus causing a slight separation between the cam 130 and the roller 133 against the force of spring 132 (the frame 20 remaining nevertheless stationary, until the roller 134 clears the apex 138). The spring 132 constantly urges the cam 130 towards the pivot pin 21, this movement being limited however by the roller 133. The other roller 134 then engages the oblique section 139 of cam 130 and the frame 30 remains in its upper position. When the lens has been positioned on the plate 28, the frame 30 is lowered by overcoming the reaction of spring 132 and the same frame 30 is reset in its original position in which it bears against the abutment member 140. When the downward movement of frame 30 is nearly completed (i.e., as it approaches its initial position) the studs 36, 37 and 45 engage the lens carried by the plate 28 and exert a certain pressure on this lens, so that the frame 20 is slightly lowered as permitted by the presence of the circular section 142 extending beneath the shoulder 136. To perform the casting operation it is only sufficient to raise the frame 20 together with the other two frames 30, 31, until the lower roller 133 clears in turn the apex 138 of the cam contour. The action then exerted by the oblique section 139 tends to lift the frame 20 and thus hold the frame assembly in the casting position during the time necessary for molding the metal and allowing it to set. The reverse sequence of steps permits the release of the lens associated with the metal block casted thereon.

Of course, the specific embodiments described hereinabove and illustrated in the attached drawings are given by way of examples and should not be construed as limiting the scope of the invention, since many modifications and variations may be brought thereto without departing from the spirit and scope of the invention as set forth in the appended claims, as will readily occur to those conversant with the art. Thus, notably, instead of moving the lens support S, with the means holding the lens on said support, towards the mold M, a reverse arrangement may be provided wherein the mold is movable towards the lens support. Moreover, for changing from the release position (in which the lens support and the mold are spaced from each other) to the casting position (wherein the lens engages the mold), the movement of the lens support towards the mold (or the movement of the mold towards the lens support) may be of any desired nature, provided that the position and orientation of the lens in relation to three reference axes of said mold, in the casting position, remain identical with the position and orientation given to this lens in relation to three predetermined reference axes in the release position.

What I claim is:

1. Apparatus for fixing a metal block to the convex surface of a concavo-convex ophthalmic lens by casting a low-melting metal into a mold engaging said convex surface preliminary to the subsequent mounting of said lens in a predetermined position on the spindle of a trimming and bevelling machine, said apparatus comprising:
    a. a frame structure;
    b. a reference cross-line mark on said frame structure;
    c. optical means determining a first and a second sighting axis;
    d. means for supporting the lens, which comprise a plate substantially horizontal when being in an inoperative position and adapted to support said lens with the convex surface up, said plate lying on the path of the second sighting axis and being suspended from gimbals so that it can be tipped in all directions in relation to said second sighting axis;
    e. means for optically superposing the first and second sighting axes, the first sighting axis being perpendicular to the center of said reference cross-line mark, the second sighting axis being substantially perpendicular to said lens when the latter is supported by said support means, in order to permit the observation of the images, superposed in a common plane, of said lens and said reference cross-line mark;
    f. means for holding said lens on said support means, and lens holding means comprising:
        a first pair of fixed studs each provided towards said plate with a substantially pin-point bearing portion to be referred to hereinafter as "the fixed bearings," which lie on a first straight line secant and perpendicular to said second sighting axis, and symmetric to said second sighting axis, first return means constantly urging said plate towards said fixed bearings, a second pair of movable studs each formed towards said plate with a substantially pin-point bearing portion, to be referred to hereinafter as "the movable bearings," which lie on a second straight line perpendicular to the plane formed by said second sighting axis and said first straight line and are symmetric to said plane, the studs of said second pair being movable in a direction substantially parallel to said second sighting axis on either side of a mean position in which said second straight line intersects both said second sighting axis and said first straight line, and second return means for urging said movable studs towards said plate;

g. casting means for forming said metal block comprising a mold having a mold cavity shaped for forming on said metal block two reference axes homologous of said reference cross-line mark and a third reference axis homologous of said first sighting axis;

h. means for allowing a relative movement of said support means and said mold in relation to each other from a release position, in which said support means and said mold are spaced from each other to permit the observation of the lens along the second sighting axis and to permit the positioning of said lens in relation to the image of said reference cross-line mark as provided by said optical superposition means, to a casting position, in which said mold engages the convex surface of the lens carried by said plate and in which the two reference axes of said mold which are homologous of said reference cross-line mark have in relation to said lens the position previously occupied in said release position by the image of said reference cross-line mark as given by said optical superposition means.

2. Apparatus as set forth in claim 1, wherein said plate is transparent and the apparatus further comprises an optical lens system disposed in the path of said second sighting axis, and a raster disposed substantially in the focal plane of said optical lens system, said transparent plate, lens system and raster being so disposed in relation to each other that the raster image formed by said optical lens system can be observed along the second sighting axis through the lens disposed on said transparent plate.

3. Apparatus as set forth in claim 1, wherein said casting means further comprise a tank filled with molten metal, connected through valve means to a casting distributor disposed plumb to said mold in the casting position thereof, said valve means being adapted to normally cut off the communication between said tank and said distributor, and to restore said communication when said support means and said mold are in their mutual casting position, and to automatically cut off said communication when a predetermined quantity of molten metal has been poured into the mold.

4. Apparatus as set forth in claim 3, wherein said valve means comprise a movable piston having one end urged by spring means against a flexible hose connecting said tank to said distributor, so as to throttle the cross-sectional passage of said hose, said piston being connected to the plunger of an electromagnet adapted, when de-energized, to leave said piston free and, when energized, to move against the resistance of said spring means for opening said passage area of said hose and thus permit the supply of molten metal to said distributor.

5. Apparatus as set forth in claim 3, wherein said mold comprises a metal body surrounded by a skirt of flexible material, the molding cavity consisting of one surface of said body, of said skirt and of the convex surface of said lens engaging said skirt, said skirt further comprising a notch registering with an outlet orifice formed in said casting distributor.

6. Apparatus as set forth in claim 5, wherein said mold skirt is movable for translation along said third reference axis of said mold.

7. Apparatus as set forth in claim 6, wherein said mold assembly, comprising said body and said skirt, is mounted to one end of a rod adapted to slide in the frame structure along said third reference axis of said mold.

8. Apparatus as set forth in claim 6, wherein said skirt is slidably mounted about the mold body.

9. Apparatus as set forth in claim 1, wherein said first fixed studs are mounted in a first frame adapted to pivot about an axis from a first abutment member determining said release position to a second abutment member determining said casting position, said plate being suspended through gimbals in a second frame adapted to pivot about the same axis as said first frame, the first return means constantly urging said plate towards said first studs acting upon said second frame, and said second movable studs are carried by a third frame adapted to pivot about the same axis as said first and second frames, said second return means associated with said movable studs for urging same towards said plate acting upon said third frame.

10. Apparatus as set forth in claim 9, wherein said third frame lies on the path of said first frame so as to be carried along thereby when said first frame is moved away from said plate, said apparatus further comprising a cam fulcrumed about a pivot pin parallel to the pivot pin of said first, second and third frame, said first frame carrying a first roller disposed at a first distance from the pivot pin of said three frames, said second frame carrying a second roller located at a second distance from the pivot pin of said three frames, said second distance being greater than said first distance, and means for urging said cam against said rollers, said cam having a contour comprising from its fulcrum outwards, a first circular section centered to the pivot pin of said three frames, a second section constituting a shoulder causing said contour to move sharply towards said pivot pin of said three frames,

* * * * *